Jan. 12, 1937.  C. SAUZEDDE  2,067,207
MOTOR VEHICLE BRAKING WHEEL DRIVING STRUCTURE
Filed Feb. 2, 1932  2 Sheets-Sheet 2

INVENTOR
Claude Sauzedde
BY
ATTORNEYS

Patented Jan. 12, 1937

2,067,207

UNITED STATES PATENT OFFICE 2,067,207

MOTOR VEHICLE BRAKING-WHEEL DRIVING STRUCTURE

Claude Sauzedde, Detroit, Mich., assignor to Detroit Hydrostatic Brake Corporation, Detroit, Mich., a corporation of Michigan Application February 2, 1932, Serial No. 590,412

4 Claims. (Cl. 180—70)

The present invention relates to a heavy-duty "dead" dropped axle dual-unit side-drive construction representing a combination with braking wheels of worm-gear driving mechanism housed in closed oppositely-disposed drive-gear casings mounted on the ends of a dropped-axle tube located below and connecting the casings, which have detachable outboard cover plate members from which outwardly project non-rotatable coaxially-pierced integral sleeves or spindles on which the braking wheels are rotatably mounted.

All the mechanism by which a plurality of radially-movable sectional-type conical double-faced brake shoes are simultaneously brought into wedging engagement with the angularly-disposed annular contacting surfaces of brake-drum side members of the braking-wheel hub is enclosed in the chamber formed between the drums and connecting felloe and thereby protected from dust, grit, water, and other efficiency-reducing "foreign" substances, the wheel-driving mechanism within the closed axle-end casings being similarly protected.

An object of the invention is to provide a self-contained dual-unit structure embracing wheel-braking and driving means so combined and disposed as to insure greater safety in operation of vehicle by providing for a lowering of its center of gravity, the driving-unit housings on opposite ends of the connecting "dropped" dead axle embodying spring seats located five or six inches below the center line of wheel-driving shafts passing through the hollow sleeves or spindles upon which the inner races of anti-friction wheel-hub bearings are mounted.

Another object of the invention is to provide a heavy-duty motor-vehicle braking-wheel dead-axle structure adapted for simultaneously driving both wheels through an outside differential unit to which are connected the propeller shafts of the side-drive wheel-driving units or for driving each wheel independently from separate sources of power, thus doing away with the need for providing differential gearing to compensate for the difference in the rate of travel between opposite driving wheels in turning corners and making it possible, in case the offside driving wheel should strike soft ground, to get back on the pavement without serious difficulty or delay, the driving effectiveness of the inboard braking wheel on the pavement being sufficient to accomplish this result.

Another object attained by my invention is relatively quick replacement of braking wheels accidentally damaged in service, each wheel being a self-contained unit easily removed from the drive-housing cover-plate spindle on which the wheel is mounted, and in case the spindle also is damaged, removal of the outboard drive-housing cover plate, of which it forms an integral part, is readily accomplished, as is also replacement of the wheel-driving shaft, removal of which is effected by taking off the inboard shaft-bearing cover plate, unscrewing the nut on the inner end of the drive shaft, and driving the latter from its tapered seat in the worm wheel that drives it and to which it is keyed.

The invention consists substantially in the described construction, combination, location, and relative arrangement of parts, as disclosed by the accompanying drawings and appended claims, but since various changes in details of construction may be made without departing from the spirit of my invention, it should be understood that restriction only to its embodiment in the preferred construction herein presented is not sought, a unitary dropped dead axle structure having symmetrically-disposed single-unit means for driving braking wheels also falling within the contemplated scope of my invention, which specifically involves the combination of driving and supporting means equivalent to what is herein shown, described, and claimed with braking wheels having sealed brake-drum hubs enclosing and protecting fluid-pressure brake-shoe actuating mechanism non-rotatably mounted on externally-splined axially-pierced wheel-supporting sleeves or spindles passing through the hubs and detachably held to axle-end housings enclosing and protecting the mechanism by means of which replaceable self-contained braking-wheel units are driven.

Of the accompanying drawings.

Figure 2:
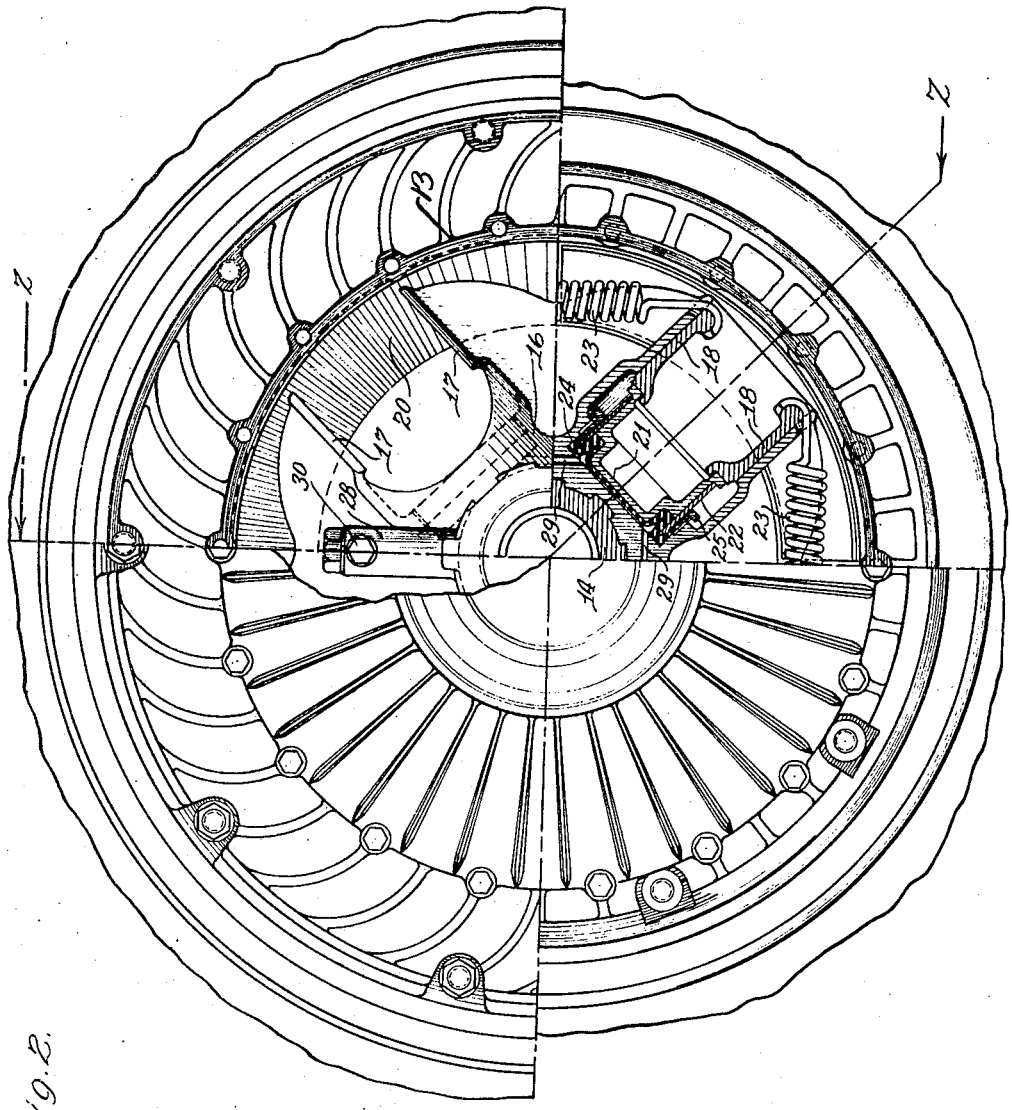
Fig. 2 is a combined elevation and sectional view of the structure of Fig. 1, taken generally on the line X—X of Fig. 1.

As indicated by both upper and lower left-hand quarters of Fig. 2, the radially-disposed ribbing of the exterior surface of the brake drum side members is the same whatever the depth of the piloting felloe to which the side members are separably attached, and the demountable tire-carrying rims are held on the felloe by similar means.

Figure 1:
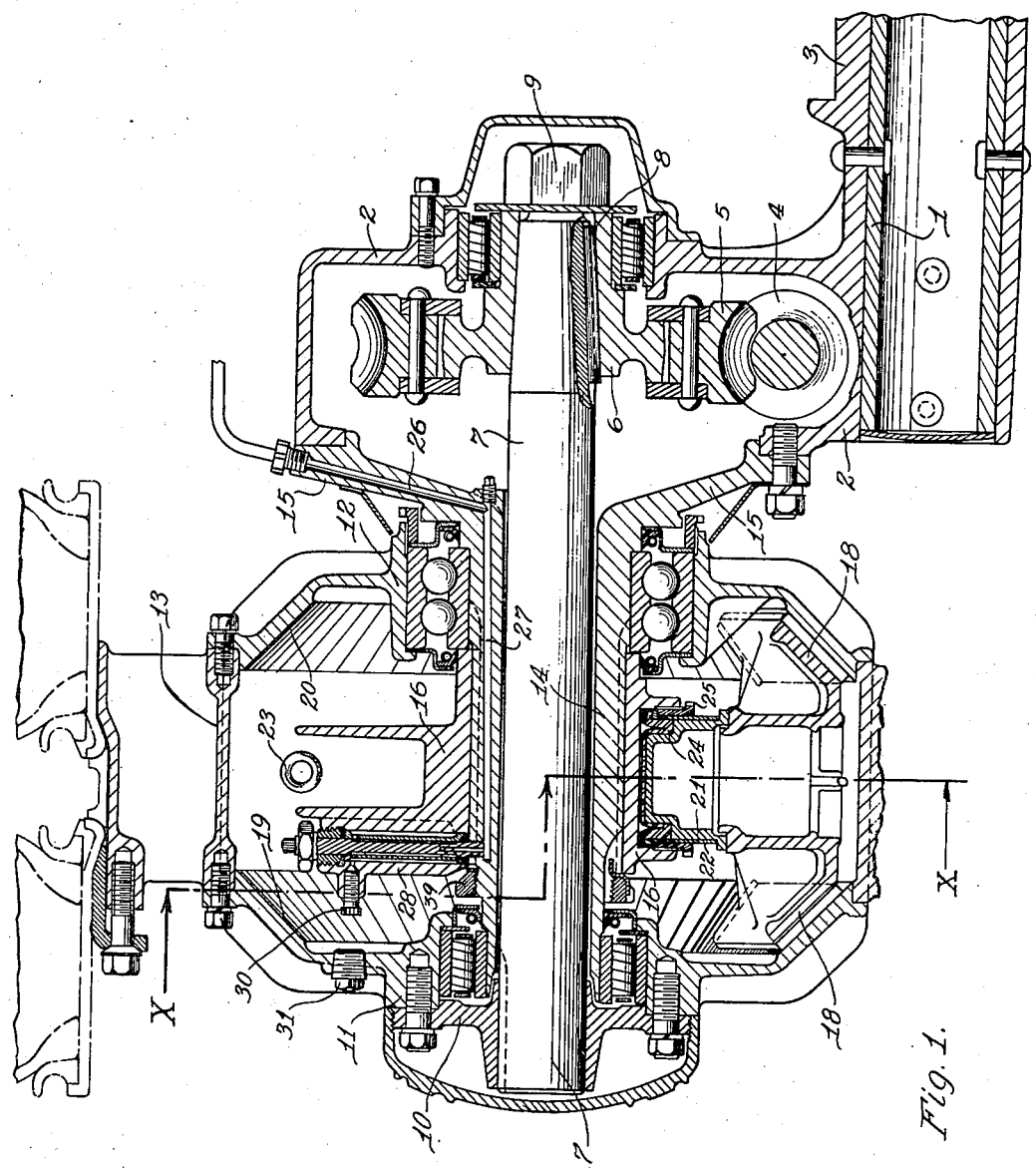
Figure 1 is a sectional view of a braking wheel of the general type of the present invention including its supporting structure, the view presenting the wheel section as taken on the line Z—Z of Fig. 2.

To each of the closed outer ends of the "dropped" dead-axle tube 1, as indicated by Fig. 1, is securely attached by riveting a driving-unit-gear housing 2 having an integral seat 3 for a chassis and body supporting spring as low down as it can feasibly be located, which means that the center of gravity of vehicle is correspondingly lowered, there being a considerable distance between the center line of each wheel-driving shaft and the face of each integral spring seat 3.

Housed within the axially-pierced casing 2 is a worm gear 4 meshing with a worm wheel 5 riveted to the hub 6, to which the tapered inboard end of the wheel-driving shaft 7 is held by the key 8, the nut 9 serving to draw the shaft into the coaxially-disposed tapered opening in worm-wheel hub. On the externally-splined outboard end of drive shaft 7 is mounted the axially-pierced internally-splined wheel-driving member 10 which is detachably fastened to the outboard brake-drum wheel-hub side member 11, with which the opposite coaxially-disposed inboard brake-drum wheel-hub side member 12 is united to form a sealed chamber for enclosing brake-shoe actuating mechanism by an annular portion of a piloting felloe employed with the present invention, the detail structure and characteristics of which are not claimed specifically herein since they may be of various forms; the detail structure is disclosed in companion applications. However, the felloe includes an annular portion 13 which serves as a spacing member for the members 11 and 12, and serves, with them, to complete the chamber for the brake mechanism.

As indicated by Fig. 1, the braking-wheel drive shaft 7 passes through an axially-pierced wheel-supporting sleeve or spindle 14 forming an integral part of the detachable outboard cover plate 15 of driving-gear casing 2. The wheel-supporting spindle 14 is externally splined to receive the axially-pierced internally-splined hub 16 of a non-rotating spider having a plurality of integral radially-disposed arms 17 for guiding and supporting a plurality of radially-movable double-faced conical brake shoes 18 of segmental sectional type adapted to be forced radially outward into contact with the oppositely-inclined annular brake-shoe contacting surfaces 19 and 20 of brake-drum wheel-hub side members 11 and 12 by fluid pressure acting on the heads of pistons 21 bearing on the under side of the brake shoes 18, which are normally held in retracted or released position by suitably-disposed springs 23 whose axes lie in the plane of the axes of the pistons 21 and cylinders 22 supported by the spider 16, the cylinders 22 within which the brake-actuating pistons 21 reciprocate being held by externally-threaded sleeve-type units 25 screwed into threaded recesses in the spider hub 16, a flexible deformable piston-head sealing member 24, rigidly clamped between the lower ends of cylinders 22 and bottom of recesses, preventing leakage of fluid and consequent loss of brake-actuating pressure.

Since the brake-shoe guiding and supporting spiders are non-rotatably mounted on splined sleeves or wheel-supporting spindles projecting outwardly from and forming an integral part of the driving-gear housings, the torsional reaction set up when brakes are applied is absorbed directly by the springs attached to the integral spring seats of the driving-unit housings riveted on opposite ends of the heavy dropped-axle tube.

Passages 26 and 27 in the outboard gear-casing cover 15 and hollow integral wheel-supporting spindle 14 projecting outwardly therefrom convey fluid under pressure developed in a chassis-mounted hand-or-foot-actuated compressor to and through a combined distributor and bleeder-valve housing 28 from which it passes into a supply duct 29 common to all the spider recesses under sealed piston heads, the piston-head seals being held out of contact with bottoms of recesses by pressure constantly maintained against the opposing pressure exerted by springs 23 that hold the brake shoes in normally released or retracted position. Leakage of fluid at the joint between spindle 14 and the fluid-distributor and bleeder-valve housing 28, which is an integral part of the spider, is prevented by suitable packing, splining of spindle and of spider hub insuring unchangeable registration of fluid supply openings in housing 28 and spindle 14.

The lockable nut 39 on spindle 14 prevents lateral or endwise movement of spider and inner race of inboard anti-friction bearing on which brake-drum side member 12 of hub turns, and metal-enclosed packings in the hub side-member recesses in which the outer races of the wheel bearings are mounted prevent bearing lubricant from entering the brake-drum hub chamber and fouling the annular brake-shoe contacting surfaces thereof.

Air entrapped in the braking fluid is removed from the braking-wheel mechanism through a bleeder valve 30 which is moved off its seat by means of a hollow wrench passed through an opening in the outboard hub side member 11 normally closed by screw plug 31.

As will be seen, all of the operating parts, including the worm 4 and worm gear 5 are located outboard with respect to the spring seat 3, the latter indicating the location of the connections with the chassis through the usual spring suspension. Hence, it will be understood that in order to preserve the usual close relation of the wheels to the chassis, the drive connections and brake mechanism must be of a form that is compact, and at the same time is capable of producing the high braking power that is requisite to meet the conditions of the heavy-duty motor vehicle service which forms the basis for the particular drive mechanism shown.

This is made possible by utilizing the outboard wall of the housing 2 as the carrier for the spindle which supports the brake mechanism, this spindle being hollow to permit the passage of the live axle 7 driven by the worm and gear drive, and the use of the particular type of brake mechanism described above, and which is of the general type disclosed in companion applications. This particular brake mechanism is capable of providing the desired brake power although the radial and axial dimensions of the chamber in which it is located is relatively small. The compact arrangement permits of the use of a relatively short spindle and thus permits the housing to be located outside of the spring suspension, with a wall of the housing forming the spindle support.

Having described my invention with a degree of clarity sufficient to enable persons skilled in the art to which it relates to understand and make practical use of it, I claim:—

1. In motor vehicle structures, wherein a dropped dead axle forms the support for a vehicle driving wheel mounting with the dead axle connected relative to the chassis by spring suspension, wherein a housing is secured on such axle and carries the spring seat, wherein a live axle is supported at one end by said housing and carries gearing driven from a motive source of the vehicle, and wherein said housing includes an outboard wall carrying a hollow spindle through which the live axle extends, the combination with such assembly, a wheel hub assembly rotatably mounted on said spindle, said hub assembly forming a closure for a hydrostatically-operated brake mechanism located internally of the hub-assembly, means between the outer end of the live axle and said hub assembly for driving the latter, said hub assembly including inboard and outboard members fixedly held in spaced-apart relation by an annular tire seat element to complete the closure walls of a chamber of which said members form inner and outer walls, each of said members carrying annular braking surfaces, said hydrostatically-operated brake mechanism being carried by the spindle within said chamber and including radially movable brake shoes movable into co-operative relation with the braking surfaces by the hydrostatic pressure, said outboard wall and spindle being channelled to operatively connect the brake mechanism with a source of pressure supply.

2. A combination as in claim 1 characterized in that the gearing is located outboard with respect to the spring-seat location.

3. A combination as in claim 1 characterized in that the brake mechanism includes a spider carried by the spindle, and a plurality of cylinder and piston assemblies carried by the spider, with the pistons movable radially and each operative to move a brake shoe structure into co-operative relation to the braking surfaces by the hydrostatic pressure, said pistons being movable in the opposite direction by spring pressure.

4. A combination as in claim 1 characterized in that the braking surfaces in cross-section extend obliquely to the live shaft axis, with the brake-shoe co-operating faces complemental to said surfaces, the obliquity of the surface of one member being opposite to that of the other member, whereby radial movement of the brake-shoes will provide concurrent activity with the opposing braking surfaces.

CLAUDE SAUZEDDE.